US005959944A

United States Patent [19]

Dockes et al.

[11] Patent Number: 5,959,944
[45] Date of Patent: Sep. 28, 1999

[54] SYSTEM AND METHOD FOR PRODUCTION OF CUSTOMIZED COMPACT DISCS ON DEMAND

[75] Inventors: Jean Francois Dockes, Sevres; Didier Pierre, Nanterre; Bruno Costa-Marini, Sevres, all of France

[73] Assignee: The Music Connection Corporation, McClean, Va.

[21] Appl. No.: 08/744,331

[22] Filed: Nov. 7, 1996

[51] Int. Cl.⁶ .............................. G11B 17/22; G11B 3/64
[52] U.S. Cl. .............................. 369/30; 369/85; 428/64.4
[58] Field of Search .................................. 369/30, 34, 36, 369/38, 85, 15, 59; 428/64.4, 64.3, 64.1; 375/220, 260; 360/15, 79, 13

[56] References Cited

U.S. PATENT DOCUMENTS

| | | | |
|---|---|---|---|
| 4,410,917 | 10/1983 | Newdoll et al. | 360/15 |
| 4,703,465 | 10/1987 | Parker | 369/30 |
| 4,811,325 | 3/1989 | Sharples, Jr. et al. | 369/85 |
| 4,937,807 | 6/1990 | Weitz et al. | 369/85 |
| 5,021,893 | 6/1991 | Scheffler | 360/15 |
| 5,041,921 | 8/1991 | Scheffler | 360/13 |
| 5,191,573 | 3/1993 | Hair | 369/84 |
| 5,233,477 | 8/1993 | Scheffler | 360/15 |
| 5,251,294 | 10/1993 | Abelow | 395/155 |
| 5,365,381 | 11/1994 | Scheffler | 360/15 |
| 5,418,654 | 5/1995 | Scheffler | 360/13 |
| 5,502,601 | 3/1996 | Scheffler | 360/32 |
| 5,518,325 | 5/1996 | Kahle | 400/70 |
| 5,539,635 | 7/1996 | Larson, Jr. | 364/401 R |
| 5,550,735 | 8/1996 | Slade et al. | 364/401 R |
| 5,592,511 | 1/1997 | Schoen et al. | 375/220 |
| 5,740,134 | 4/1998 | Peterson | 369/30 |

FOREIGN PATENT DOCUMENTS

0312404 A2   4/1989   European Pat. Off. .

*Primary Examiner*—Ali Neyzari

[57] ABSTRACT

A system and method for production of customized compact discs on demand includes acquisition means for acquiring audio data from a plurality of commercial-quality CDs and converting the audio data to digital format; mass storage means, coupled to the acquisition means, for storing the audio data in digital format; indexing means for associating identification data uniquely attributable to the plurality of commercial-quality CDs with their respective audio data in digital format; order processing means for compiling customer data including particularized selection data and shipping data; writing means for recording the customer data to a blank CD; packaging means for labeling the blank CD recorded by the writing means and inserting same in a box for shipment; and production management means, coupled to the mass storage means, indexing means, order processing means, writing means, and packaging means, for controlling production of the customized CDs.

15 Claims, 4 Drawing Sheets

SYSTEM AND METHOD FOR PRODUCTION OF CUSTOMIZED COMPACT DISCS ON DEMAND

BACKGROUND OF THE INVENTION

1. Field of the Invention

The present invention relates generally to production of compact discs (also known as "CDs"), and more particularly to a system and method for production of customized compact discs on demand.

2. Statement of the Prior Art

High fidelity was redefined for audiophiles as soon as they heard the pure digital sound of a compact disc (CD). The sonic range of plastic-coated CDs was so superior to the older "hi-fi" recordings that, by the 1990s, long-playing (LP) vinyl discs were becoming obsolete.

In the past, the production of a CD began with a high-quality sound recording on magnetic tape. Conversion of the constantly changing analog signal on such tapes into a digital signal made the CD markedly different from an LP, the factor that enhances audio reproduction. To digitize the signal, it was first converted into a series of electrical pulses.

Conventional digitization was done by electronic circuits that sample the analog signal about 40,000 times a second. These electronic circuits converted the strength of the signal at each of the samplings into a given number in the digital signal. A series of digital pulses was then fed to a "write" laser that illuminated portions of a photosensitive material applied to a master disc. Whenever there was a pulse in the signal, the laser burnt a small oval pit into the surface of the spinning disc. Eventually, an alternating pattern of such pits and "lands" (i.e., flat areas) remained on the master.

After the master disc had been so inscribed, the spiral series of pits and lands was then impressed on the molded plastic CD base. A layer of reflective aluminum was then applied to the label side and topped by a protective layer of plastic. The side opposite the label, as is typical, contained all the recorded information on the CD. The minuscule pits and the lands were arranged in a spiral line similar to the groove on a conventional phonograph record, but they were more closely spaced and capable of storing much more information. Unlike the grooves of an LP, however, the pit tracks on a CD originate near the center hole and spiral outward. A "read" laser was thereafter used to read the CD by starting on the inside and moving to the outside.

In the early 1980s the first CDs, which were nearly 5 inches (12.7 centimeters) in diameter, stored the same amount of sound on one side as a 12-inch (30.5-centimeter) LP reproduced on two sides. Such CDs could store and play back up to about 80 minutes of music. For shorter selections, there were also so-called "singles", that is, 3-inch (7.6-centimeter) discs comparable to 45-rpm records.

The CD advantage over LPs and audiocassettes went beyond accuracy of sound reproduction and longer playing time. Digital signals from an audio CD provide a greater dynamic range than analog signals from an LP or audiocassette (e.g., 90 decibels, compared to 70 decibels). Moreover, the groove-and-stylus mechanism of a conventional phonograph can damage recordings or alter their sound, and audiotapes often unravel. There is no physical wear and tear from the laser in a CD player, however, and dust and minor scratches cause almost no distortion. Accordingly, CDs have become almost universally popular.

Notwithstanding their popularity, one distinct problem which exists with currently available audio CDs is their limited selection. Buyers must go to the store or consult a catalog and purchase CDs having music in the order that is preselected by the production studio. There are no "one-offs". That is, there is a complete absence in the prior art of systems and methods for efficiently and cost-effectively producing custom CDs which are determined by the buyer's choice in music/artists.

The primary reason for such absence is that high-quality, digital audio data is very bulky. One minute of CD-audio data uses around 10 Megabytes of storage. Accordingly, a system storing 10,000 titles (or about 35,000 minutes of music), would need around 400 Gigabytes of storage space. While possible, using this amount of magnetic disc storage would be quite expensive when one takes into account the price of magnetic discs and the price of a computer big enough to manage those discs.

An alternative manufacturing approach to avoid this storage problem would be to store masters as removable media in jukeboxes. However, using removable media in automated libraries has the potential of introducing reliability and data availability problems. In order to manufacture at least one thousand custom discs per day with conventional CD recorders, for example, a CD production system would have to retrieve ten titles each minute. That is demanding, both in terms of library accesses and data transfer rate.

One solution to the aforementioned problems would be to compress the audio data to reduce the storage requirements. It has been found, furthermore, that the Motion Picture Experts Group (i.e., MPEG) audio compression standard is most effective when utilized in accordance with the present invention.

SUMMARY OF THE INVENTION

Accordingly, it is a general object of the present invention to provide for improved production of compact discs (also known as "CDs"). It is a more particular object of the present invention to provide a system and method for production of customized CDs on demand.

These and other objects, advantages, and novel features according to the present invention are provided by a recording system for producing customized CDs including acquisition means for acquiring audio data from a plurality of commercial-quality CDs and converting the audio data to digital format; mass storage means, coupled to the acquisition means, for storing the audio data in digital format; indexing means for associating identification data uniquely attributable to the plurality of commercial-quality CDs with their respective audio data in digital format; order processing means for compiling customer data including particularized selection data and shipping data; writing means for recording the customer data to a blank CD; packaging means for labeling the blank CD recorded by the writing means and inserting same in a box for shipment; and production management means, coupled to the mass storage means, indexing means, order processing means, writing means, and packaging means, for controlling production of the customized CDs.

In accordance with one important aspect of the present invention, the acquisition means generally comprises one or more personal computers, each of which has a small computer system interface (SCSI) bus; a SCSI card coupled to the SCSI bus of the personal computer; a CD reader, coupled to the SCSI bus of the personal computer through the SCSI card, for directly reading the audio data in digital format; and an audio compression card, coupled to the personal computer, for compressing the audio data in digital format.

The audio compression card preferably employs the MPEG audio compression approach, or any other suitably lossy compression scheme. Several possible compression ratios yield different levels of sound quality. CD-audio quality can be achieved with compression ratios around 5 to 7. However, the recording system according to the present invention can use different compression ratios for different types of music. The compressed data tracks are stored as individual files on magnetic discs on a data server. There is thus no limit to the amount of audio data that can be stored, except the capacity of the machine used for the data server. The acquisition means according to the present invention may also comprise a graphical user interface for inputting the identification data to a relational database. In such a manner, track titles, artist names, etc. may be searched and retrieved, associated with their respective audio data.

In order to increase the output of customized CDs, the recording system according to the present invention may further comprise a CD transporter coupled to the CD reader for loading and unloading the plurality of commercial-quality CDs.

The writing means according to the present invention also comprises one or more personal computers, each of which has a small computer system interface (SCSI) bus; a SCSI card coupled to the SCSI bus of the personal computer; a CD writer, coupled to the SCSI bus of the personal computer through the SCSI card, for writing the customer data; and a CD transporter, coupled to the CD writer, for loading the blank CD and unloading a customized CD having the customer data recorded thereon. For the purpose of increasing production levels of such CDs on demand, the recording system according to the present invention preferably comprises a plurality of such writing means connected to wide area/local area networks.

Like the reading means according to a presently preferred embodiment of the invention, the audio data in digital format is ideally compressed and the writing means further comprises means for decompressing such compressed audio data. Even more preferably, the decompressing means comprises software on the personal computer that is adapted to decompress the compressed audio data in digital format "on the fly". That is, there is no need nor a desire for a compression card to be included with the writing means according to the present invention.

The particularized selection data includes one or more tracks of the audio data, the title(s) of the song(s) associated with each one of the one or more tracks, and the name(s) of the artist(s) recording such song(s), and the shipping data includes a customer's name and shipping address.

Three printers are also preferably included with the recording system according to the present invention. A first printer is used for printing the title(s) of the song(s) associated with the one or more tracks, as well as the name(s) of the artist(s) recording such song(s) on a customized CD having the customer data recorded thereon. A second printer is used for printing an insert for the box and a customer's invoice. Finally, a third printer is used for printing the customer's name and shipping address on a shipping label.

The storage subsystem may also include an archival and backup application for easy restoration in case of either disc failure or temporary removal of little used titles. In such cases, the storage subsystem utilizes CD-R discs for storage.

Further aspects, details and features of a presently preferred embodiment of this invention will become readily apparent from the following detailed description thereof, when considered in conjunction with the accompanying drawings wherein:

DETAILED DESCRIPTION OF A PREFERRED EMBODIMENT

Figure 1:
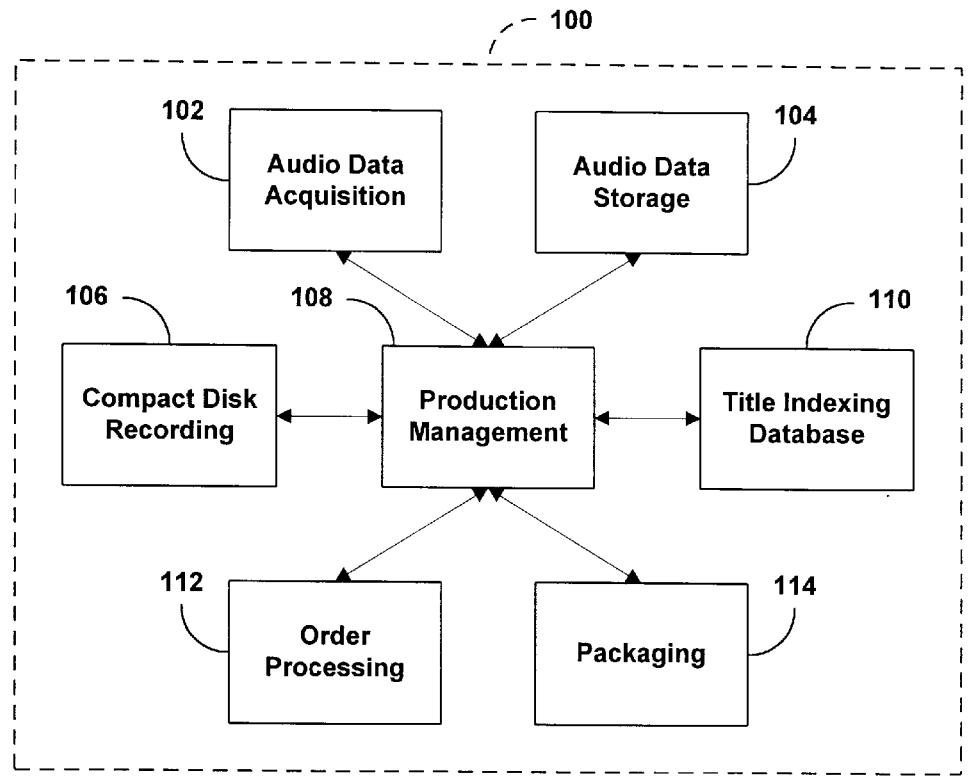
FIG. 1 is a block diagram of the system and its associated subsystems according to a presently preferred embodiment of the invention.

Referring now to the drawings, wherein like characters designate like or corresponding parts throughout the several views, there is shown in FIG. 1 a block diagram of a recording system 100 for production of customized compact discs on demand in accordance with the present invention.

System 100 generally comprises seven associated subsystems 102–114 which are directed to the means for acquisition 102 and storage 104 of audio data in digital format, compact disc (CD) recording 106, production management 108, title indexing database 110, order processing 112, and packaging 114 associated with high-volume, custom CD recording.

Audio Data Acquisition

The music stored within the system 100 preferably originates from standard, commercial, CD-audio discs. Accordingly, the data acquisition process must read and compress the data from those discs, participate in data identification and indexing, and send the data to the storage subsystem.

Figure 2:
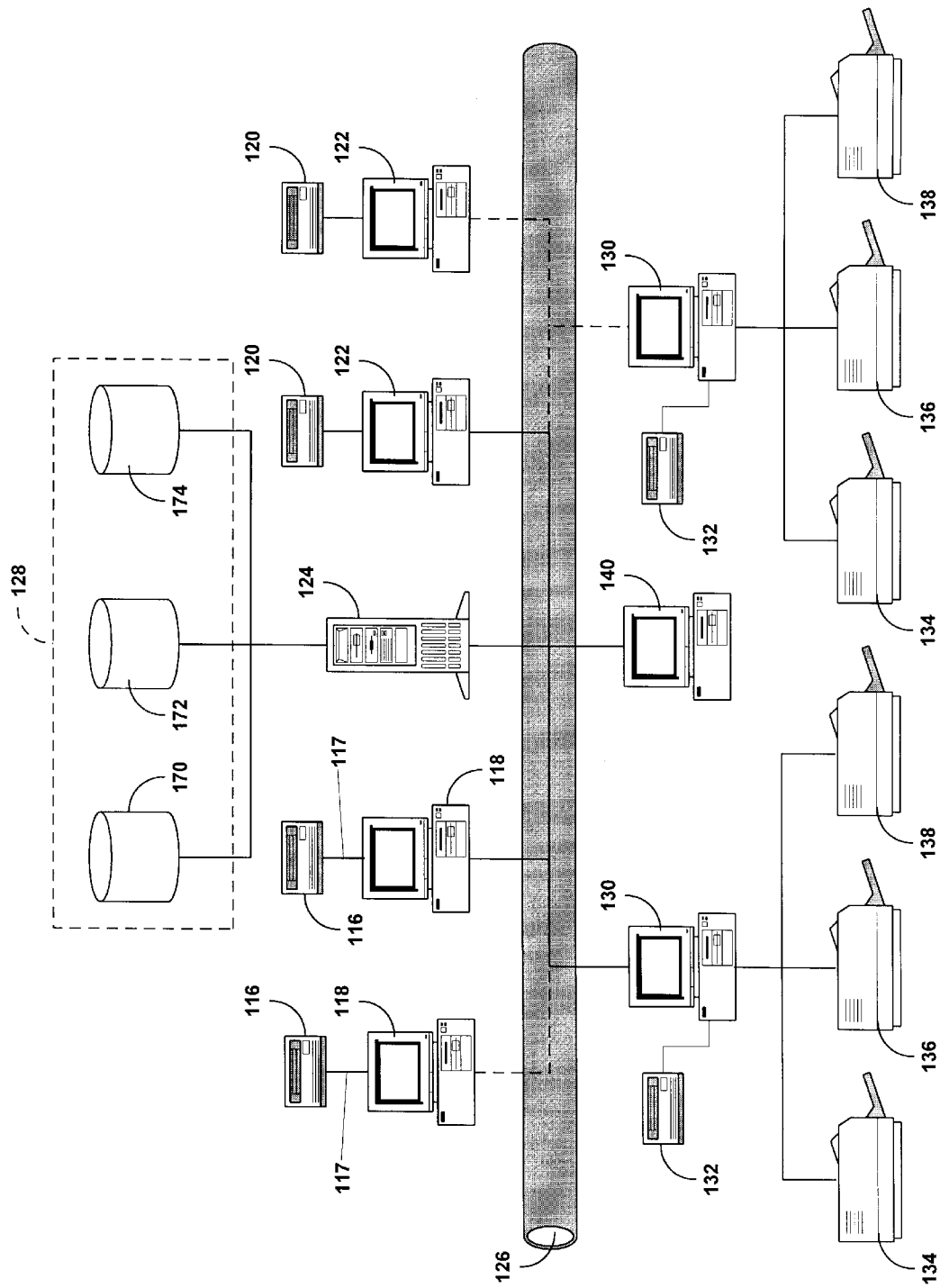
FIG. 2 is an architectural diagram of the clients and server used in the system according to the present invention.

Data is directly read in digital format using a CD reader 116 (FIG. 2) connected through a SCSI bus 117 to a reading client 118. In this manner, the full quality of the original data is substantially preserved (as opposed to digitizing the audio output of the CD reader 116). It is also a much simpler and faster method than using a digital audio interface such as AES/EBU. On the negative side, not all CD readers are able to reliably extract audio data, and the hardware has to be carefully selected.

Certain critical choices must be made regarding the compression system, not only because the compression process has been found to be the limiting speed factor, but also because there are certain quality-related issues about the compression algorithm. Some psychoacoustic factors must be chosen by the designer which influence sound quality (as opposed to the MPEG decompression which is fully specified and always produces the same data). The selected solution is to use a hardware-assisted compression system, using PC boards with professional—studio quality—sound processing.

Besides reading and compressing audio data from the source discs, the acquisition subsystem 102 has to link the audio data to the descriptive elements found in the textual database (e.g., title, author, date of recording, etc. . . . ). Most CD-audio discs have no identification data on them. Accordingly, an operator has to tell the system the identification (database reference) of every disc prior to acquisition of its audio data.

Once a source disc has been identified, it will be recognized every time it is loaded on the system 100, so that there is no risk of loading the wrong data in cases where the reading occurs in several sessions. The physical identification is based on the disc's geometry (i.e., its exact track sizes).

A graphical interface is also used to facilitate the identification task, which can be performed in advance of the reading and compression process (in other words, an operator will identify a pile of discs to the system, and then let it work alone during the rest of the day and night).

Compact Disc Recording

Compact disc recorders currently available in the marketplace can write at four times the basic speed (i.e., where the basic speed is the normal music playing speed). This represents an audio data rate of around 700 kilobytes/second. At this speed, a CD recorder can produce approximately 4–5 discs per hour, depending on how full the discs are. To make 1000 discs a day, it would then be necessary to connect about ten such CD recorders 120 to the system 100, for an aggregate average data rate around 7 megabytes/second.

The CD recorders 120 (FIG. 2) must work in real-time and cannot be paused during a track recording, although they can stop between tracks. Accordingly, the data must be decompressed before being written to the discs, a CPU-intensive process. Only very high-end multiprocessor systems would be capable of this kind of performance, and there has been no prior experience as to the feasibility of such a system.

One particularly preferable solution, therefore, is to distribute the process to multiple clients 122 connected to a server 124 through one or several Ethernet networks 126. Each writing client 122 is connected to a respective CD recorder 120, which may be conveniently managed by a conventional disc transporter (not shown) to automate disc loading, to retrieve the compressed data from the server 124 and handle decompression and writing.

The compressed data is currently loaded to the writing client's magnetic disc before being recorded, but the system architecture is designed to allow for direct server-to-CD real-time data paths, if this would be deemed necessary in the future. The gains in performance would probably not be enough to compensate the additional complexity and loss of reliability, but this might still be necessary if the system had to support such applications as real-time music broadcasting.

Production Scheduling and Management

The disc fabrication jobs that come from the order-processing subsystem 112 are queued and managed on the data server 124, which is responsible for dispatching them to the first available writing client 122. With the recording system 100 according to the present invention, additional writing clients 122 can be added or taken off-line without server reconfiguration, and jobs can be automatically restarted in cases of client failures.

Title Indexing Database

All the textual information about the musical titles (titles, authors, musicians, administrative data, etc. . . ) are primarily stored in an INFORMIX relational database 128 on the data server 124. A selected portion of the information can be downloaded to a full-text search database (WAIS), primarily to facilitate on-line title selection by customers through an Internet connection which may be used alternatively using a WWW (i.e., World Wide Web) browser. A number of graphical interfaces, running on the data server 124, may be implemented as necessary to suitably manage and add information to the INFORMIX database 128.

Order Processing

Figure 5:
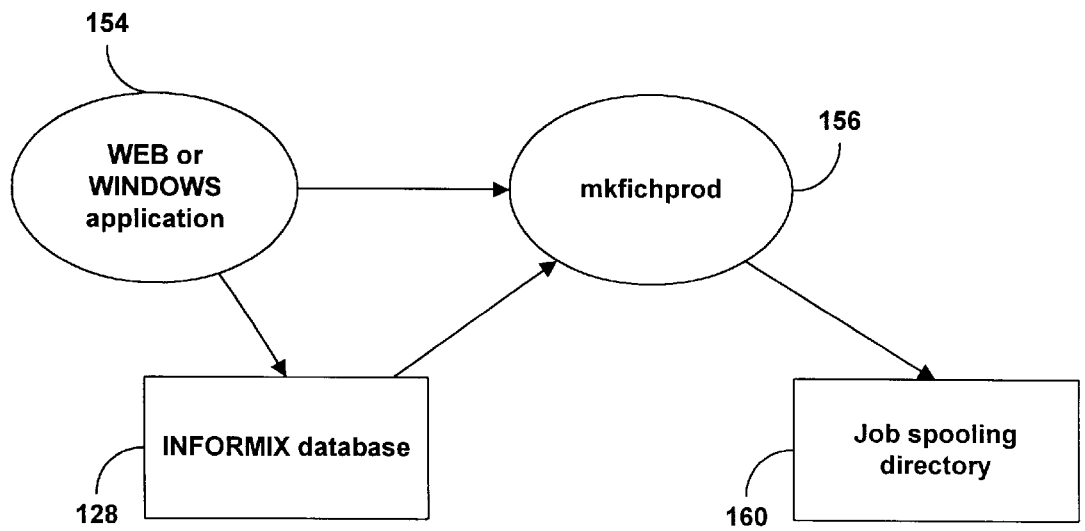
FIG. 5 is a flow diagram illustrating the order taking process which is used in the system according to the present invention.

Several sources of customer orders are possible with the recording system 100 (e.g., postal delivery, direct telephone access, and INTERNET accesses). As shown in FIG. 5, customer orders received through the mail are input to the system 100 through a PC-WINDOWS application; alternatively, INTERNET orders are directly created by the customers through a WEB interface 130.

In all cases, the commercial and order-related information is stored in the INFORMIX database 128. The initial order processing results in the creation of <<job files >> which summarize the task to be performed by the production system.

Packaging

Once a stack of written discs has been taken from the writing system's output, the discs must be prepared for shipping. The tasks to be performed are: (1) identifying the disc; (2) printing the list of titles on the disc's top surface; (3) printing the list of titles on the jewel box, back insert sheet; (4) printing the invoice; and (5) printing the customer address label. Operators use an integrated application to perform these operations on a batch of discs.

As all discs look the same when coming out of the writing process, there must be a way to identify each of them before the printing and packaging. The identification number of each disc is coded as very low level noise in the first seconds of silence before the first track. More precisely, the identification data is stored inside a special format, fixed-size frame which is written as audio data. The frame begins with a 16-bit word with the two least significant bits set (e.g., value=3), and followed by words where only the least significant bit is used to store the next bit of serialized identification data. This sequence is repeated 150 times (which, given the frame size, translates to slightly more than 1 second of <<silence >>). Using only the low bit ensures that the result is inaudible.

The Data Server

The data server 124 is preferably a SUN machine running the SOLARIS system. Its primary function is to store all the audio data and its descriptive information. Audio data is stored as MPEG compressed audio files, and descriptive data is stored partly in the INFORMIX database 128 and partly in specialized files.

Processes on the data server 124 monitor the writing 122 and reading 118 clients to send or receive audio files as needed, and manage the spooling of disc production jobs and their dispatching to the writing clients 122.

The data server 124 currently also runs the WWW server. The data storage, INFORMIX and WWW functions could be performed on separate machines if needed.

The Writing Client

The writing client 122 is preferably an INTEL PC machine running the UNIXWARE operating system. It is connected to a respective CD recorder 120. The recorder 120 is, in turn, usually integrated in a conventional disc transporter (not shown) to automate disc loading. Such disc transporters automatically select a disc from the input stack magazine and places it in the open drawer of its companion disc writer 120. When the disc writing operation is completed, it is moved to the output stack magazine and another blank disc is automatically loaded for continuous production flow. One suitable such disc transporter is the KODAK Disc Transporter, manufactured by the Eastman Kodak Company, of Rochester, N.Y. Such disc transporters come with a standard mechanical interface for the KODAK PCD Writer 600 which, with its 6× speed, is capable of writing approximately 550 MB to disc in ten minutes. In combination, therefore, such a disc transporter and writer is capable of high-volume, unattended disc production to 75 discs overnight.

The writing client 122 requests a job (a disc to be made composed of a group of music titles or tracks) from the data server 124, then retrieves each compressed track, decompresses and writes it to the CD recorder 120, until the job is done, after which it requests another job. In accordance with another important aspect of the present invention, however, decompression and writing happen in parallel. That is, if for the purposes of illustration one assumes that a first selected track of a job (i.e., "track 1") is retrieved first by the writing client 122 from the data server 124, it will then be decompressed and thereafter written to the blank disc in real time. While track 1 is, thus, being written, as many subsequent tracks (e.g., "track 2" through "track n") as can be retrieved and decompressed will be done so in parallel with the writing process of track 1, so as to best utilize writing client 122 resources. As a result, immediately upon completion of the writing step which writes track 1, writing client 122 will begin writing track 2 in real time. As such audio data must be written in real time, without pausing (except between tracks), there must be a relationship between the CPU power of writing client 122 and the possible writing speed of the CD recorder 120. For example, a Pentium 120 machine will easily write at twice the base speed, while a Pentium 150 will handle a 4× drive with enough margin.

The Reading Client

The reading client 118 extracts audio data from source audio CDs, does the compression, and sends the data to the data server 124. It also runs a part of the data indexing interface. Both functions are executed by PC machines running SCO UNIXWARE, with a board for audio data compression (e.g., a Digigram PCX11 board manufactured by Digigram) and a conventional disc transporter to automate disc loading. As is conventional, a UNIX device driver may be written to manage the compression board (not shown). The system's SCSI drivers can also be extended to fully manage the CD drives 116 and the disc transporter (the same SCSI driver is used for the writing process). Because of the use of a compression board, the reading client 118 needs less CPU power than the writing one, but will otherwise use approximately the same configuration. Both functions can be alternatively performed by the same machine.

The Printing Client

Every operator performing the packaging tasks has a PC machine, or printing client 130, running UNIXWARE. Every printing client 130 is in turn connected to a CDROM drive 132 to identify the discs, and to several printers 134–138. A thermal transfer printer 134 is preferably used to print the disc surface. One suitable such thermal transfer printer is the Perfect Image CD Printer manufactured by Rimage Corporation, of Minneapolis, Minn. An advantage important such thermal transfer printers enjoy over inkjet printers used in prior art approaches to labeling CDs is that they do not require specially coated CD-R discs to accept the ink from the printing process. Though most media manufacturers offer printable discs, they are more expensive than traditional media and may not be as readily available. Further details regarding such thermal transfer printers which may be used in the system according to the present invention may be found in an article in *CD-ROM Professional,* September 1996, at pages 86–90, which is incorporated herein by reference. A laser printer 136 (e.g., an HP LaserJet 5MP) may be used to print the invoice and jewel box, back insert, and a suitable label printer 138, such as the SEIKO smart label printer PRO, may be used for printing the address label.

The printing client 130 runs a graphical interface for operator interaction, and retrieves the necessary data from the data server.

The Order Input Client

The order input client 140 is a PC running MICROSOFT WINDOWS, which is used to type in the order sheets received by mail. It runs a VISUAL BASIC program to update the INFORMIX database 128 on the data server 124. However, this client 140 is not needed if all the orders are taken through the WEB interface.

Processes and Data Flow

This section details the sequencing and information flows of the main system operations: indexing and acquiring the data from a source disc, taking an order, making a disc.

Data Acquisition

Figure 3:
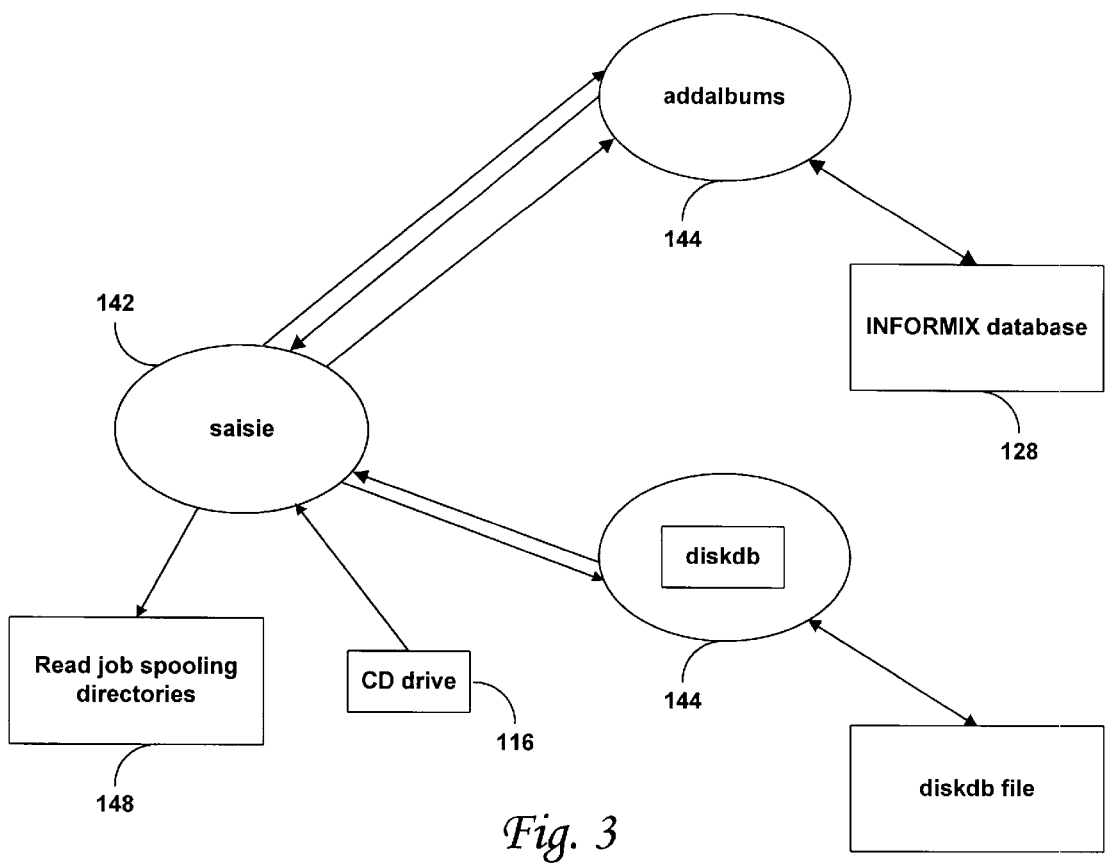
FIG. 3 is a flow diagram illustrating a first aspect of the data acquisition process which is used in the system according to the present invention.
Figure 4:
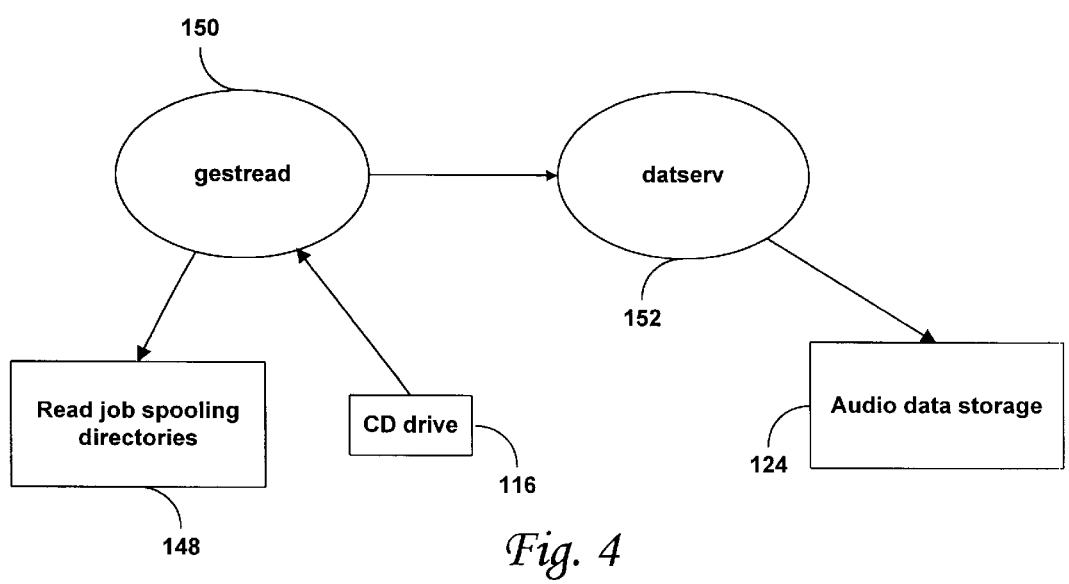
FIG. 4 is a flow diagram illustrating a second aspect of the data acquisition process which is used in the system according to the present invention.
Figure 6:
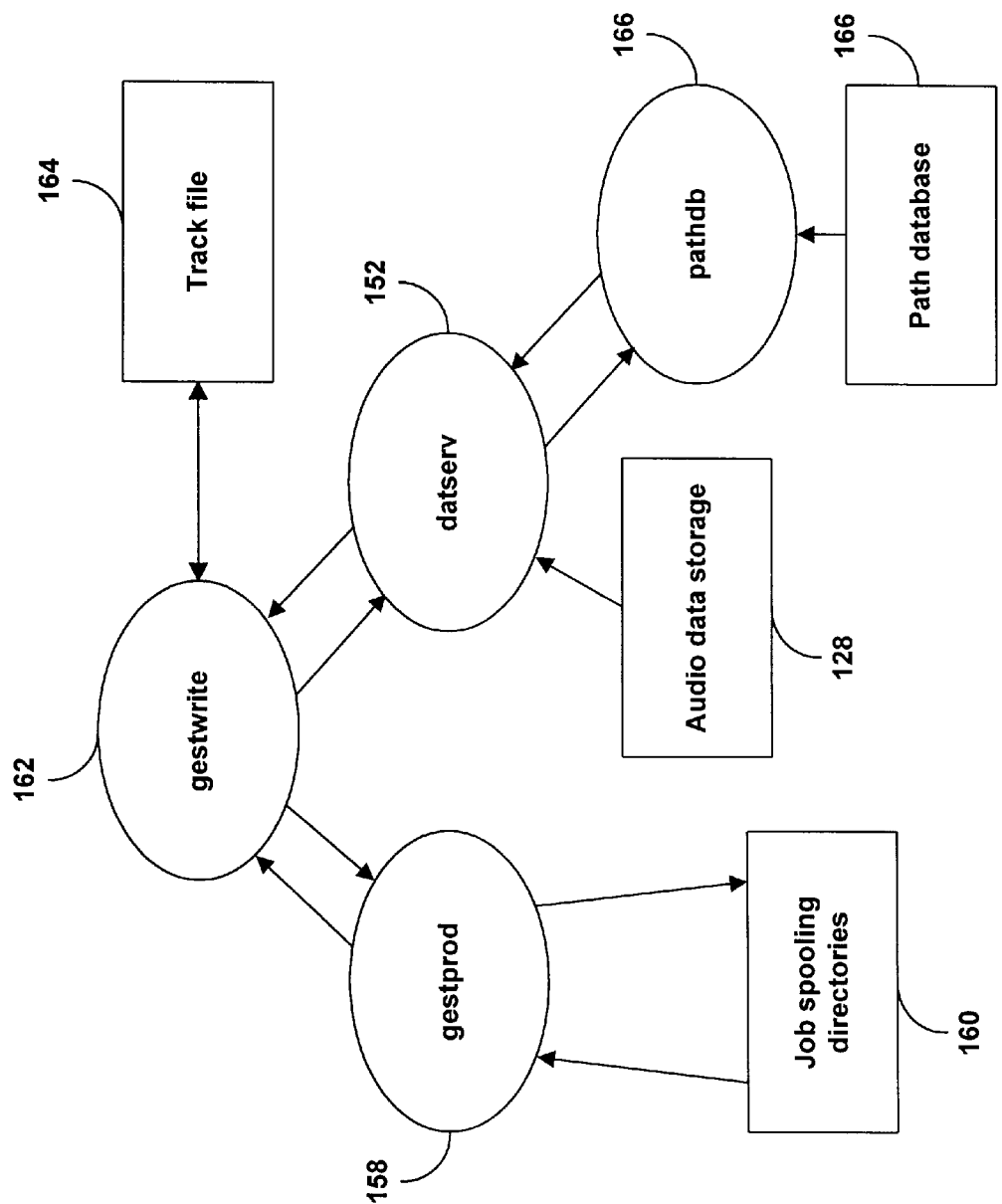
FIG. 6 is a flow diagram illustrating the disc making process which is used in the system according to the present invention.

The data acquisition process starts when new discs arrive to be used as the source for new music to be integrated in the database and later sold. All the audio data managed in the system currently comes from standard audio CDs from which it is read and compressed. There are generally three steps involved in this process, as shown in FIGS. 3 and 4.

First, an operator indexes the discs by entering information in the INFORMIX database 128 (disc title, producer, list of track titles, producer, authors, etc. . . . ). Alternatively, such data could come from an external database instead of being entered by hand. Second, the operator then identifies the discs to the system by loading each disc on a reading client's CD drive 116 and linking it to the INFORMIX data. It is also possible, but unusual, to enter the indexing data at this time. This is done through the <<identify>> option of the saisie program 142. saisie will read the disc geometry and request a new discid from the disc database 144 (there are special cases when the disc is already known). saisie will then start the addalbums.tel program 146 on the server 124 (the display goes to the reading station through X windows). The operator uses addalbums.tel to find the INFORMIX data for the loaded disc and confirm its choice. At this point the discid (the stockid column in the cds table) will be entered in the INFORMIX database 128, and the link will be created between the physical disc and its indexing data. When this is done, the saisie program will generate a job file in a spool directory 148 to describe the reading task to a gestread daemon 150 (at this point the job file sits in a waiting directory).

Third, the actual data reading (a time-consuming process) takes place in batch and possibly at night. This is sequenced automatically by the saisie program which will load every disc, by using an autochanger or asking the operator, identify the disc and move the correct job file to gestread's active directory 148, then wait for the job to be finished and do the next disc. For each disc in turn, gestread reads and compresses requested tracks (not necessarily all, this is described in the job file), and sends the data for storage to the server 124. Once read, tracks are identified by a compound object named the tracked, containing the discid and the track number. Gestread and saisie run on the reading client 118, while discdb, addalbums, and datserv 152 run on the data server 124.

Taking an Order

The order-taking process is fairly straightforward and simple. As shown in FIG. 5, a WINDOWS or WEB interface 154 is used to enter the order description in the INFORMIX database 128 (customer details, payment, list of titles for every disc). The order is then activated by the periodic execution of the mkfichprod.tel program 156 on the server 124. mkfichprod.tel 156 scans the database 128 for waiting orders, and creates job files for the gestprod daemon 158 in its spool directory 160. There is one job file created for each disc in every order. The job file contains the list of tracks that should be written to the disc, and a job number (edsetid from the cdset INFORMIX table). If several copies of a disc are ordered, only one job file is created, and the number of copies is indicated in the job file.

Making a Disc

In the disc making sequence, the data server's gestprod process 158 first finds a job file in its <<new>> spooling directory 160. gestprod then waits for a writing client 122 to be available, and dispatches the new job to it. It moves the job file to an <<inprog>> directory. The gestwrite 162 process on the writing client 122 then. gets the job file, and, for each track to be written, retrieves the data by talking to the datserv process 152 on the server 124 (send a tracked, retrieve track data, then store it to a local file), then decompresses and writes it in parallel to the CD writer 120. Each temporary track file 164 is kept on the client 122 until the end of the job, so that the data is reused if multiple copies of the disc are to be produced. The datserv process 152 thereafter retrieves the actual track file access path by requesting it from the pathdb process 166. When the disc is finished, gestwrite unloads it, sends status to gestprod which moves the job to the <<done>> directory, loads a blank disc (either by prompting the operator, or by using the autochanger), and requests another job from gestprod. There are certain provisions which may be used to handle the miscellaneous error cases and retry jobs on another client when meaningful. gestwrite runs on the writing client 122, while gestprod, datserv, and pathdb run on the data server 124.

Archival Process

Every time a track is acquired and stored on the data server 124, the datserv process generates an archival request job file in the archival spool directory. archiv will get the archival requests from its input directory, and make ISO9660 CDROM discs with the data to archive, until all the requests are satisfied, asking its user to mount blank discs as needed. The CD writer and the disc buffer used for ISO image formatting can be connected to the server, or a client machine can be used.

Each archive disc will contain audio tracks and the auxiliary data that relates to them. Optionally, arbitrary directories can be backed up on the disc. It is presently preferable to archive the current state of the INFORMIX database 128 and the full discs 142 and paths database 168 along with the audio tracks.

Data Organization

Introduction All the permanent data is stored on the data server 124 (with the exception of local configuration files on other machines). The bulk of the data stored by the system 100 is audio data. The audio data is divided into tracks which each hold a song or a musical sequence. Every track is stored as an MPEG compressed stream, in a system file. The system also stores a great deal of auxiliary data, whose main purpose is to enable the selection and the access to the audio tracks, and other administrative functions. The biggest part of the auxiliary data is stored in the INFORMIX database 128, but there are also specialized files of miscellaneous formats.

The configuration files are files that hold miscellaneous parameters in a convenient format and define or point to other things. The storage database is a specialized database used to organize the audio data storage. As can be expected, the audio files are files which hold audio data. Finally, the INFORMIX database 128 holds the title descriptions and the commercial data.

The Configuration Files

There is usually one configuration file 170 for every machine, each of which is pointed to by the CONFIGFILE environment variable (so that it is actually possible to have different configuration files for different programs). The configuration files 170 are ASCII files holding statements in the form of <<varname=value;>> where value can be an integer, a floating point value, a string, or an integer array. The configuration files 170 are mostly used to define system parameters, but the same format is also used for the job files that describe various tasks to be performed by the system, and for other purposes. The system's programs use a C++ to conveniently access and, if necessary, modify such files.

There is also a utility program (trparam) to print out the files with a possible format translation (as Bourne Shell or TCL statements) so that it's easy to retrieve values from a non-C++ program.

The Storage Database

The storage database 172 is a set of special format files which are used to organize and manage the audio files. The disc database 142 is used to manage the source discs and the audio data acquisition process. The volume and path databases 168 are used to organize the storage and remember where the audio files are.

The Disc Database

The disc database's role is to give a unique number to every physical source disc (the discid), and relate this number to the physical disc's geometry (exact track sizes). The discid and disc geometry are stored in the disc database at identification time (during the data acquisition process), and the discid is also entered in the INFORMIX disc description, so that the disc will be automatically recognized each time it is loaded later on. This makes it possible to index the data and read it at different times, or read part of it later, without any risk of linking the wrong indexing and audio data. It is quite possible, but very improbable, that several discs will have exactly the same geometry. These cases will have to be handled through a special, non automated, operation for data acquisition. The disc database 142 is used only during data acquisition. When making discs, the INFORMIX database 128 and the audio files are linked through the path database 168, without any use of the disc database 142.

Disc Database Files

There are three types of files in the disc database: (1) the discident.discid file holds the last attributed number to easily ensure discid uniqueness; (2) the discident file is an indexed gdbm file which relates the disc geometries to the discids. The descfiles hold descriptive data mostly redundant with what is in the INFORMIX database, to ensure a level of redundancy and help diagnose possible problems. They are also used for communication between the client 122 and the server 124 during disc identification. There is one descriptive file for every disc, their format is in the configuration file format.

The Volume and Path Database

The volume and path database (otherwise known as the path database) 168 keeps track of where the audio files are. Each audio track has a unique number, called the trackid. The trackid is currently made from the track's source disc's discid and the track's number (from 0 to 99). The trackid is currently stored as a 32-bit integer, with 24 bits for the discid and 8 bits for the track number. As the discid is only used at disc identification time, it would be quite possible to make up trackids for sound tracks that would not come from compact discs. The path database 168 links the trackids to file paths.

The storage space is divided in volumes. Every volume has a unique number. There are currently two kinds of volumes which are: (1) UNIX directories used to store live data (the directories are usually mount points for the storage discs, but this is not mandatory); and (2) CDs used for archiving copies of the compressed audio tracks, either for pure backup purposes or for enabling future retrieval of data not currently on magnetic disc.

The live data volumes are described in the data server's configuration file. Each volume has a line looking like:

volpath3=<</dir/otherdir/myvoldir >>;

meaning that the access path for volume 3 is /dir/otherdir/myvoldir (on the actual system the path is actually more likely to be like <</vol3 >>).

The archival volumes are not described in the system, except, implicitly, by the list of their content. The access path is determined when they are mounted to be used.

The main file of the path database is the pathdbfile, which is a gdbm indexed file, which has a record for each copy of every trackid (one trackid can currently have a live copy and an archival copy, but this is not limiting).

Each pathdbfile record describes an audio file (format, audio parameters, MPEG rate, etc. . . . ), gives its storage volume number, and its access path inside the volume.

Volumes are also redundantly identified by a volumeid file stored in their top directory, and containing the volume number, for checking purposes.

The Audio Files

The audio tracks are preferably stored exclusively as raw MPEG streams. The MPEG format includes full audio parameter description in the frame header, so that there is no need for a special file header. The file names are chosen by a data server process at acquisition time. The emptiest volume is chosen and the internal file name is based on the trackid. The files in each volume are hashed in a number of directories to avoid having too many files in one directory.

The INFORMIX Database

The INFORMIX database 128 stores all the music description (titles, authors, etc. . . . ), and the commercial information (customer names, addresses, commands, etc. . . . ). The music description is structured around the source albums, and formatted within the INFORMIX database in the following table formats.

The Albums Table

Each row in this table describes an album. An album is a standard musical issue as sold in stores, and can contain several discs (cds table). The albums table has the following columns:

TABLE 1

| column name | data |
| --- | --- |
| albid | album's unique identification (INFORMIX serial number) |
| prodid | album's producer's identification |
| distrid | album's distributor identification (if needed) |
| labelid | album's label identification (if needed) |
| codebar | commercial barcode (e.g., UPC or "uniform product code") |
| catacode | album's reference in the producer's catalog |
| albnb | number of discs in album |
| albtitre | album title |
| albtype | album type code (see albtype table) |
| albdate | album's date |
| albdate1 | for albums that cover a period of time, the period's end |
| comments | free text area (internal use) |
| graphediteur | album's graphic editor name |
| albinfo | free text area (external use, like movie title for movie) |

The Cds Table

Every row in the cds table describes one disc. There may be one or several discs in every album.

TABLE 2

| Column name | data |
| --- | --- |
| cdid | CD serial number |
| cdalb | album serial number (i.e., link to albums) |
| cdalbpos | CD position in the album |
| stockid | CD discid in the disc database |
| codebar | CD commercial barcode (e.g., UPC or "uniform product code") |

The Titres Table

Every row in the titres table describes a musical track.

TABLE 3

| Column name | data |
| --- | --- |
| titrid | the track's serial number |
| cdid | the track's disc's serial (link to cds) |
| tind | the track's number on its disc (1–100) |
| nom | The track's title |
| duree | the track's duration in seconds |
| origalb | the track's original album |
| prodid | the track's producer if different from the album's |
| distrid | the track's distributor if different from the album's |
| labelid | the track's label identification |
| codeisrc | the ISRC recording session identifier |
| tdate | the date of recording |
| tgenre | the musical style code |
| tssgenre | the musical substyle code |
| tvalid | expiration date for the producer's license agreement |
| comments | free text area |
| interp1 | artist id of the first interpret |
| interp2 | same for second |
| interp3 | same for third |
| auteur | author (text) |
| compositeur | composer (text) |
| graphediteur | graphic editor id |
| musiciens | list of musicians and instruments (special format text) |

TABLE 3-continued

| Column name | data |
| --- | --- |
| stocstate | storage status:<br>1. stored on the server's hard discs<br>2. archived but removed from hard disc<br>3. not stored |
| titralire | title selection status during the acquisition process |
| catadate | date when this title was issued in a catalog |
| titrinfo | extra information free text area |

The Tradac Table

TABLE 4

| Column name | data |
| --- | --- |
| tradid | serial number |
| trlang | language (Us, Fr, De, etc.) |
| trtitrid | title's serial in the titres table |
| tmom | title translation |
| trinfo | titrinfo column's translation |

The Albtype Table
This table lists the different album types

TABLE 5

| Column name | data |
| --- | --- |
| nom | type designation |
| code | serial number |

The Genre Table

TABLE 6

| Column name | data |
| --- | --- |
| nom | style name |
| ptinom | short name (internal) |
| numero | serial |

The Instruments Table

TABLE 7

| Column name | data |
| --- | --- |
| iid | serial |
| idbname | internal instrument name |
| iname | external instrument name |
| icomments | free text area |

The Artistes Table

TABLE 8

| Column name | data |
| --- | --- |
| artid | serial |
| nom | last name |
| prenom | first name |
| arttype | Artist type:<br>0: individual<br>1: band (like the Beatles)<br>2: orchestra, big-band (supporting)<br>3: duet<br>>100 fake entry, used for sub-catalog handling<br>=>=100 + sub-style catalog nb. In this |

TABLE 8-continued

| Column name | data |
| --- | --- |
| | case, acata is the parent catalog nb |
| agenre | musical style serial |
| acata | catalog identification (if any) where artist is classified |

The Producteurs Table
Function: list of producers, labels, distributors

TABLE 9

| Column name | data |
| --- | --- |
| prodid | serial |
| nom | name |
| adresse | address |

The Distribueurs Table
Function: list of distributors

TABLE 10

| Column name | data |
| --- | --- |
| distrid | serial |
| nom | name |
| adresse | address |

The Graphediteurs Table
Function: list of graphic editors

TABLE 11

| Column name | data |
| --- | --- |
| editid | serial |
| nom | name |
| adresse | address |

The Catalogs Table
Function: list of catalogs already issued

TABLE 12

| Column name | data |
| --- | --- |
| cataid | serial |
| catanom | catalog name |
| catagenreid | musical style id |
| cataparent | 'parent catalog' (if any) id. (when catalog appears as a "sub-catalog". i.e. "gospel" is a sub-catalog of "jazz volume 1") |
| usname | English catalog name |
| catastatus | 1 if catalog ready but not issued yet. NULL or 0 otherwise |

The Clients Table
Each row describes a customer (client in French)

TABLE 13

| Column name | data |
| --- | --- |
| clientid | serial |
| nom | Title, first name, last name (e.g., Mr. Jean-Francois Dockes) |
| adresse1 | first address line |
| adresse2 | second address line |
| ville | city and zip code |

TABLE 13-continued

| Column name | data |
| --- | --- |
| pays | country |
| telephone | phone number |
| comments | free text area |
| solde | credit or debt |
| provenance | how the customer got to know us |

The Commandes Table

Each row describes a customer order (commande in French)

TABLE 14

| Column name | data |
| --- | --- |
| comclientid | customer's serial |
| comdate | order date |
| comcode | 1. Mail order |
| | 2. Minitel |
| | 3. Audiotel |
| | 4. Kiosk system |
| | 5. Internet |
| comnbcdset | disc count |
| commode | Way of payment: |
| | 1. Check |
| | 2. Credit card |
| | 3. Cash |
| | 4. Free |
| combank | customer bank |
| comnb | check or Credit Card number |
| compexpdate | Credit Card expiration date |
| comprix | amount paid |
| linom=>lipays | delivery information (when different from the customer's) |

The cdset Table

TABLE 15

| Column name | data |
| --- | --- |
| cdsetid | serial |
| cdsnbcd | number of copies to be made |
| cdsnbtracks | track count |
| cdscomid | Order number (link to commandes) |
| cdsstatus | −1: Production not started |
| | 0: Production started |
| | 1−n: 1−n copies made |
| cdstid1– cdstid20 | titrids of the disc's tracks |

Programs

The programs in the recording system 100 according to the present invention can be roughly classified in three categories: (1) daemon programs; (2) user interface programs; and (3) miscellaneous utility programs.

The daemon programs do the actual job of acquiring music or making discs, are written in C++, run on the different machines, and talk to each other through TCP/IP sockets. The user interface programs are used by operators and an administrator to control the system or enter data. These are mainly written in TCL/TK with the exception of the VISUAL BASIC program used to enter paper orders. The miscellaneous utility programs mainly used as a <glue> between other pieces. They are written in C++, TCL, or as shell scripts.

Database accesses are performed mainly through a TCL module which allows embedding SQL statements in TCL programs, or through shell scripts. There are no SQL statements in C++programs (the production system does not actually use the INFORMIX database).

The Daemon Programs

Data Acquisition Programs gestread: this program runs permanently on the reading client 118 and is responsible for reading and compressing tracks and sending them to the server 124, once a well identified disc has been mounted, and a reading job has been issued. It takes its instructions from files that it finds in a spool directory.

datserv: This program runs permanently on the data server 124 and will accept identified compressed data and store it on the server. It is also used for the production process. It talks to its clients on a TCP/IP socket.

discdb: This program runs permanently on the data server 124 and manages the disc database 142 (disc geometry to discid correspondence). It is used only during the disc identification phase. It talks with its clients on a TCP/IP socket.

pathdb: This program runs permanently on the data server 124 and manages the path database 168 and the volumes storage space (it handles trackid to path translations, and chooses where a new file is going to be stored). Its main client is the datserv process, to which it talks on a TCP/IP socket.

Disc production programs gestprod: This program runs permanently on the data server 124 and is the main disc making job dispatching process. It takes job descriptions as files in a spool directory and dispatches them to the writing clients 122. The jobs are generated from the INFORMIX database and the different possible order-taking interfaces.

gestwrite: This program runs permanently on the writing client 122 and makes discs. It connects to the gestprod process to retrieve a job, then gets the compressed tracks from the dataserv process, and writes the disc. It manages the autoloader in a different manner from the acquisition process where the autoloader is managed by the user interface.

The pathdb and datserv programs are also used by the production process, and have roles mostly symmetrical from what they do for data acquisition.

User Interface Programs addalbumds.tcl: This is the main program to add or modify disc indexing data to the INFORMIX database 128. It has a graphical interface and is written in TCL.TK. It is run on the data server.

gestcom.tcl: This is the customer management interface, and runs on the data server 124.

archiv: data archiving program, runs on the data server and copies compressed tracks to archive discs.

operator: a simple operator interface program to be used by daemons on the reading 118 and writing 122 clients.

print.tel: the operator interface on the printing station 130, it talks to the INFORMIX database 128 on the server 124 and executes several other programs to identify the disc and do the printing.

saisie: as its name does not indicate, this is a TCL program and it manages the operator interface for the data acquisition process, on the reading client (communicates with the other subsystems to handle the disc identification, the linking to the INFORMIX database and the disc reading sequencing later on).

sunsamp.tcl: a program to generate sound samples on the server (for realaudio or other purposes).

Miscellaneous Utility Programs checkdb.tcl: INFORMIX database logical coherency checking checkopmail: a small shell script to check if the operator user has E-mail, which usually signals trouble.

count: a small counting program for use in shell-scripts doubltons.tcl: TCL/TK program to be run on the server to help eliminate duplicate titles by listening to them. Handles the messy details.

dtx: converts digital to hex, for use in shell-script. Easier than de.

generique.tcl: a TCL/TK program which automatically generates a screen to access any INFORMIX Tables (finds the columns and generate entry fields). Very useful to perform unexpected tasks on the database.

isqltel, isqlwish: The TCL/TK interpreters, extended for INFORMIX access.

killbyname killedjobs startedjobs: shell scripts to start and stop the permanent tasks.

launchadd.tcl: a small wrapper program running on the server and used by saisie to access the INFORMIX database.

mk9660: a program to format an ISO 9660 CDROM image, used by the archival process.

playlist.tel: select and listen to a list of titles.

proprint: utility to print the SEIKO printer.

restarch.tcl: a program to restore selected tracks from archive discs. The tracks are designated as a list of titrids.

slog: show the log files.

softmpg: command line interface for the XING MPEG decompression library.

titreart.tcl a useful interface to look for titles tredwav: audio file handling (not only WAV)

trdiscdbcli: Command line interface to the disc database. Used by saisie trmpsnd: Command line interface for the DIGIGRAM board. Compresses, decompresses, plays and records files.

trparam: parameter (configuration file) access. Will print them or translate them to TCL or shell.

trpathdbcli: a command line interface to pathb. Used by TCL programs when they have to access sound files.

trsccd: CDROM driver interface trsccdr: CD writer driver interface trscch: disc transporter driver interface uscsi: generic SCSI driver utility to execute arbitrary commands on a SCSI device.

Obviously, many modifications and variations of the improved recreational board according to the present invention are possible when viewed in light of the foregoing teachings. For example, videodiscs (which are laser discs that store visual images as well as sound) are coded on both sides and outperform videocassettes of films for home viewing. CD-ROM (read-only -memory) and CD-I (interactive) are spin-offs of such videodiscs. Compton's MultiMedia Encyclopedia, for example, is a CD-ROM version of the illustrated 26-volume set, with added animation, audio, and many other features (see Reference Books). With CD-I, sophisticated computer programs are stored on discs that mix graphics, text, and stereo sound. The options range from you-are-there game simulations-with actual stadium images and crowd sounds-to interactive job-training sessions. CDs can also be duplicated using recordable discs and DAT (digital audiotape) machines.

It should be understood, therefore, that all such forms of recorded data and media, modifications and variations thereto could be reproduced in accordance with the present invention and would, thus, be deemed to fall within the scope of the appended claims.

What we claim as our invention is:

1. A recording system for producing customized compact discs (CDS), comprising:

acquisition means for acquiring audio data from a plurality of commercial-quality CDS and converting said audio data to digital format;

mass storage means, coupled to said acquisition means, for storing said audio data in compressed digital format;

indexing means for associating identification data uniquely attributable to said plurality of commercial-quality CDS with their respective audio data in digital format;

order processing means for compiling customer data including particularized selection data and shipping data;

writing means for recording audio data identified by said customer data to a blank CD, said writing means including means for decompressing said compressed audio data in digital format on the fly;

packaging means for labeling said blank CD recorded by said writing means and inserting same in a box for shipment; and production management means, coupled to said mass storage means, said indexing means, said order processing means, said writing means, and said packaging means, for controlling production of the customized CDs.

2. The recording system according to claim 1, wherein said acquisition means comprises:

a personal computer having a small computer system interface (SCSI) bus;

a SCSI card coupled to said SCSI bus of said personal computer;

a CD reader, coupled to said SCSI bus of said personal computer through said SCSI card, for directly reading said audio data in digital format; and an audio compression card, coupled to said personal computer, for compressing said audio data in digital format.

3. The recording system according to claim 2, wherein said acquisition means further comprises a graphical user interface for inputting said identification data to a relational database.

4. The recording system according to claim 2, further comprising a CD transporter coupled to said CD reader for loading and unloading said plurality of commercial-quality CDs.

5. The recording system according to claim 2, wherein said audio compression card comprises a card complying with a Motion Pictures Experts Group (MPEG) audio standard.

6. The recording system according to claim 1, wherein said writing means comprises:

a personal computer having a small computer system interface (SCSI) bus;

a SCSI card coupled to said SCSI bus of said personal computer; and a CD writer, coupled to said SCSI bus of said personal computer through said SCSI card, for writing said customer data; and a CD transporter, coupled to said CD writer, for loading said blank CD and unloading a customized CD having said customer data recorded thereon.

7. The recording system according to claim 1, wherein said particularized selection data includes one or more tracks of said audio data, the title(s) of the song(s) associated with said one or more tracks, and the name(s) of the artist(s) recording said song(s), and said shipping data includes a customer's name and shipping address.

8. The recording system according to claim 7, further comprising:

a first printer for printing the title(s) of the song(s) associated with said one or more tracks and the name(s) of the artist(s) recording said song(s) on a customized CD having said customer data recorded thereon;

a second printer for printing an insert for said box and a customer's invoice; and a third printer for printing said customer's name and shipping address on a shipping label.

9. A method for producing customized compact discs (CDS) on demand, comprising the steps of;

acquiring audio data from a plurality of commercial-quality CDS;

converting said audio data to digital format;

compressing said audio data in digital format:

storing said compressed audio data in digital format in amass storage means;

associating identification data uniquely attributable to said plurality of commercial-quality CDS with their respective audio data in digital format;

compiling customer data including particularized selection data and shipping data for processing orders therefrom;

selecting compressed audio data in digital format according to said particularized selection data;

decompressing said selected compressed audio data in digital format on the fly and recording said decompressed data to a blank CD;

labeling said recorded CD;

inserting said recorded CD in a box for shipment; and controlling production of the customized CDS.

10. The method according to claim 9, wherein said acquiring step comprises the steps of:

providing a personal computer having a small computer system interface (SCSI) bus, a SCSI card coupled to said SCSI bus of said personal computer, and a CD reader, coupled to said SCSI bus of said personal computer through said SCSI card;

directly reading said audio data in digital format; and compressing said audio data in digital format prior to said storing step.

11. The method according to claim 10, further comprising the steps of:

providing a graphical user interface; and inputting said identification data to a relational database through said graphical user interface.

12. The method according to claim 10, further comprising the step of loading and unloading said plurality of commercial-quality CDs automatically.

13. The method according to claim 9, wherein said recording step comprises the steps of:

providing a personal computer having a small computer system interface (SCSI) bus, a SCSI card coupled to said SCSI bus of said personal computer, and a CD writer, coupled to said SCSI bus of said personal computer through said SCSI card;

writing said customer data with said CD writer; and loading said blank CD and unloading a customized CD having said customer data recorded thereon with a CD transporter.

14. The method according to claim 9, wherein said compiling step comprises the steps of;

providing particularized selection data which includes one or more tracks of said audio data, the title(s) of the song(s) associated with said one or more tracks, and the name(s) of the artist(s) recording said song(s); and providing shipping data which includes a customer's name and shipping address.

15. The method according to claim 14, further comprising the steps of:

providing a first printer for printing the title(s) of the song(s) associated with said one or more tracks and the name(s) of the artist(s) recording said song(s) on a customized CD having said customer data recorded thereon;

providing a second printer for printing an insert for said box and a customer's invoice; and providing a third printer for printing said customer's name and shipping address on a shipping label.

* * * * *